(12) United States Patent
Lee et al.

(10) Patent No.: US 12,255,312 B2
(45) Date of Patent: Mar. 18, 2025

(54) LITHIUM SECONDARY BATTERY

(71) Applicant: LG Energy Solution, Ltd., Seoul (KR)

(72) Inventors: Jeong Woo Lee, Daejeon (KR); Min Ji Heo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 847 days.

(21) Appl. No.: 17/311,165

(22) PCT Filed: Mar. 6, 2020

(86) PCT No.: PCT/KR2020/003199
§ 371 (c)(1),
(2) Date: Jun. 4, 2021

(87) PCT Pub. No.: WO2020/180160
PCT Pub. Date: Sep. 10, 2020

(65) Prior Publication Data
US 2022/0029152 A1  Jan. 27, 2022

(30) Foreign Application Priority Data
Mar. 7, 2019  (KR) .................. 10-2019-0026395

(51) Int. Cl.
*H01M 4/36* (2006.01)
*H01M 4/131* (2010.01)
(Continued)

(52) U.S. Cl.
CPC ............ *H01M 4/364* (2013.01); *H01M 4/131* (2013.01); *H01M 4/133* (2013.01); *H01M 4/134* (2013.01);
(Continued)

(58) Field of Classification Search
CPC ...... H01M 4/364; H01M 4/131; H01M 4/134; H01M 4/386; H01M 4/505; H01M 4/525;
(Continued)

(56) References Cited

U.S. PATENT DOCUMENTS

2008/0081263 A1   4/2008  Saisho et al.
2011/0079752 A1   4/2011  Park et al.
(Continued)

FOREIGN PATENT DOCUMENTS

CN   101154755 A   4/2008
CN   103907235 A   7/2014
(Continued)

OTHER PUBLICATIONS

International Search Report for Application No. PCT/KR2020/003199 mailed Jun. 16, 2020, pp. 1-3.
(Continued)

*Primary Examiner* — James M Erwin
(74) *Attorney, Agent, or Firm* — Lerner David LLP

(57) ABSTRACT

The present invention relates to a lithium secondary battery having excellent battery performance at high voltage, wherein the lithium secondary battery according to the present invention includes a positive electrode which includes a positive electrode active material layer including a lithium nickel cobalt manganese-based oxide having an average particle diameter of primary particles of 3 μm or more and a lithium cobalt-based oxide, a negative electrode which includes a negative electrode active material layer including a negative electrode active material, and an electrolyte, wherein a ratio of negative electrode capacity to positive electrode capacity is in a range of 1.06 to 1.15.

12 Claims, 4 Drawing Sheets

(51) Int. Cl.
*H01M 4/133* (2010.01)
*H01M 4/134* (2010.01)
*H01M 4/38* (2006.01)
*H01M 4/505* (2010.01)
*H01M 4/525* (2010.01)
*H01M 4/62* (2006.01)
*H01M 10/0525* (2010.01)
*H01M 10/42* (2006.01)

(52) U.S. Cl.
CPC ........... *H01M 4/386* (2013.01); *H01M 4/505* (2013.01); *H01M 4/525* (2013.01); *H01M 4/621* (2013.01); *H01M 4/625* (2013.01); *H01M 10/0525* (2013.01); *H01M 2010/4292* (2013.01)

(58) Field of Classification Search
CPC ................. H01M 4/621; H01M 4/625; H01M 2010/4292
USPC ....................................... 429/231.8
See application file for complete search history.

(56) References Cited

U.S. PATENT DOCUMENTS

| | | | |
|---|---|---|---|
| 2013/0327993 A1* | 12/2013 | Cho | ........................ B60L 50/64 429/231.95 |
| 2014/0030588 A1 | 1/2014 | Hong et al. | |
| 2014/0050985 A1 | 2/2014 | Lee et al. | |
| 2014/0106218 A1* | 4/2014 | Lee | ....................... C08F 220/34 526/240 |
| 2014/0346394 A1 | 11/2014 | Park et al. | |
| 2014/0356719 A1 | 12/2014 | Park et al. | |
| 2015/0010818 A1 | 1/2015 | An et al. | |
| 2015/0010819 A1 | 1/2015 | Lee et al. | |
| 2015/0104704 A1 | 4/2015 | Kim et al. | |
| 2015/0162598 A1 | 6/2015 | Kim et al. | |
| 2015/0311512 A1 | 10/2015 | Paulsen et al. | |
| 2015/0318537 A1 | 11/2015 | Nishio et al. | |
| 2016/0093912 A1 | 3/2016 | Zheng et al. | |
| 2017/0346128 A1* | 11/2017 | Fujii | ..................... H01M 4/525 |
| 2018/0233738 A1 | 8/2018 | Jung et al. | |
| 2018/0358625 A1* | 12/2018 | Oguro | ................. H01M 50/443 |
| 2018/0366776 A1 | 12/2018 | Zheng et al. | |
| 2019/0044179 A1* | 2/2019 | Sugimori | .............. H01M 4/131 |

FOREIGN PATENT DOCUMENTS

| | | |
|---|---|---|
| CN | 104471759 A | 3/2015 |
| CN | 104488126 A | 4/2015 |
| CN | 105514350 A | 4/2016 |
| CN | 108352506 A | 7/2018 |
| JP | 2004192846 A | 7/2004 |
| JP | 2009217981 A | 9/2009 |
| JP | 2018085221 A | 5/2018 |
| KR | 20060108110 A | 10/2006 |
| KR | 20080024597 A | 3/2008 |
| KR | 20100130522 A | 12/2010 |
| KR | 20140018137 A | 2/2014 |
| KR | 20140018685 A | 2/2014 |
| KR | 20140024587 A | 3/2014 |
| KR | 20150004197 A | 1/2015 |
| KR | 20150006283 A | 1/2015 |
| KR | 20150092258 A | 8/2015 |
| KR | 20170057220 A | 5/2017 |
| KR | 20180014962 A | 2/2018 |
| WO | 2014068931 A1 | 5/2014 |

OTHER PUBLICATIONS

Search Report for European Application No. 20766774.2 dated Nov. 3, 2021. 2 pgs.

* cited by examiner

LITHIUM SECONDARY BATTERY

CROSS-REFERENCE TO RELATED APPLICATIONS

The present application is a national phase entry under U.S.C. § 371 of International Application No. PCT/KR2020/003199, filed on Mar. 3, 2020, which claims priority to Korean Patent Application No. 10-2019-0026395, filed on Mar. 7, 2019, the disclosures of which are incorporated by reference herein.

TECHNICAL FIELD

The present invention relates to a lithium secondary battery having excellent life characteristics and swelling characteristics at high voltage.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Recently, demand for high-capacity batteries tends to increase more and more, and, accordingly, research and development of lithium secondary batteries operated at a high voltage (for example, 4.3 V or more) capable of increasing battery capacity have been actively conducted.

Various lithium transition metal oxides, such as $LiCoO_2$ and $LiNi_{1-n-m}Co_nMn_mO_2$ (0<n<1, 0<m<1), have been used as positive electrode active materials of the lithium secondary batteries.

$LiNi_{1-n-m}Co_nMn_mO_2$ is advantageous in that it may achieve relatively high capacity characteristics, but, since a side reaction occurs at a high voltage of 4.2 V or more, there is a limitation in that battery performance is rapidly degraded and swelling occurs.

$LiCoO_2$ is advantageous in that it exhibits excellent cycle characteristics even at a high voltage, but, since residual amounts of charge and discharge are low, there is a limitation in that capacity characteristics are poor.

In order to address the above limitations, techniques using a mixture of two or more different lithium transition metal oxides as a positive electrode material have been attempted. However, in a case in which the lithium transition metal oxides having different components are mixed and used, new problems, which did not occur when one type of lithium transition metal oxide was used, occur. For example, with respect to a secondary battery in which a mixed positive electrode material of $LiNi_{1-n-m}Co_nMn_mO_2$ and $LiCoO_2$ is used, a phenomenon occurs in which a positive electrode potential is more reduced during charge and discharge than a secondary battery in which $LiNi_{1-n-m}Co_nMn_mO_2$ or $LiCoO_2$ is used alone, and, as a result, the problem occurs in which battery performance is rapidly degraded while a side reaction occurs under high-temperature and/or high-voltage conditions.

DISCLOSURE OF THE INVENTION

Technical Problem

An aspect of the present invention provides a lithium secondary battery having excellent cycle characteristics and swelling characteristics even during a high-temperature and/or high-voltage operation.

Technical Solution

According to an aspect of the present invention, there is provided a lithium secondary battery including: a positive electrode which includes a positive electrode active material layer including a lithium nickel cobalt manganese-based oxide and a lithium cobalt-based oxide; a negative electrode which includes a negative electrode active material layer including a negative electrode active material; and an electrolyte, wherein an average particle diameter of primary particles of the lithium nickel cobalt manganese-based oxide is 3 µm or more, and a ratio of negative electrode capacity to positive electrode capacity is in a range of 1.06 to 1.15.

Advantageous Effects

A lithium secondary battery according to the present invention has a wide operating voltage range by using a mixture of a lithium nickel cobalt manganese-based oxide and a lithium cobalt-based oxide as a positive electrode active material, and, as a result, high energy density and high capacity characteristics may be achieved.

Also, in the lithium secondary battery according to the present invention, since large particles, in which a primary particle diameter is 3 µm or more, are used as the lithium nickel cobalt manganese-based oxide, a contact area with an electrolyte solution is smaller than that of a conventional lithium nickel cobalt manganese-based oxide, which has been commonly used, to minimize a side reaction with the electrolyte solution, and, accordingly, degradation of capacity and generation of swelling during a high-voltage operation may be effectively suppressed.

Furthermore, since the lithium secondary battery according to the present invention is designed so that a capacity ratio of a negative electrode to a positive electrode satisfies a specific range, it may effectively suppress a problem that occurs in a secondary battery in which a conventional mixed positive electrode material of a lithium nickel cobalt manganese-based oxide and a lithium cobalt-based oxide is used, that is, the occurrence of rapid degradation of battery characteristics under high-temperature and/or high-voltage conditions.

MODE FOR CARRYING OUT THE INVENTION

Figure 1:
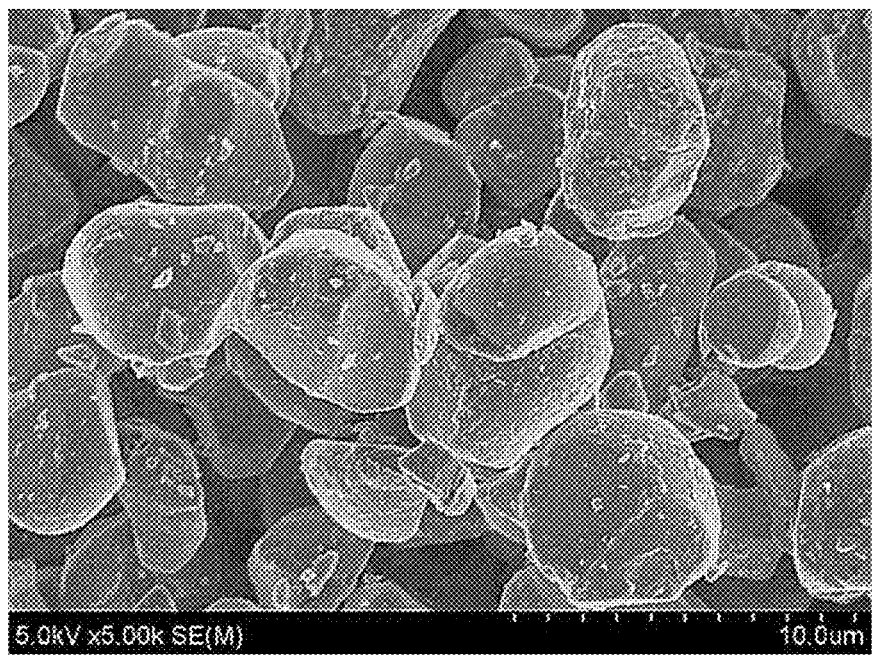
FIG. 1 is a scanning electron microscope (SEM) image of lithium nickel cobalt manganese-based oxide powder prepared by Preparation Example 1.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "average particle diameter ($D_{50}$)" in the present specification may be defined as a particle diameter at a cumulative volume of 50% in a particle size distribution curve, and the average particle diameter ($D_{50}$) may be measured by using a laser diffraction method. Specifically, after target particles are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at the cumulative volume of 50% may then be calculated by the measurement instrument.

In the present specification, the expression "ratio of negative electrode capacity to positive electrode capacity" denotes a value obtained by dividing theoretical discharge capacity per unit area of a negative electrode by theoretical discharge capacity per unit area of a positive electrode.

Also, in the present specification, the expression "%" denotes wt % unless otherwise specified.

Hereinafter, the present invention will be described in more detail.

A lithium secondary battery of the present invention includes a positive electrode including a positive electrode active material layer, a negative electrode including a negative electrode active material layer, and an electrolyte, wherein the positive electrode active material layer includes a lithium nickel cobalt manganese-based oxide having an average particle diameter $D_{50}$ of primary particles of 3 μm or more and a lithium cobalt-based oxide as a positive electrode active material, and a ratio of negative electrode capacity to positive electrode capacity is in a range of 1.06 to 1.15.

With respect to a secondary battery typically using a lithium nickel cobalt manganese-based oxide alone as a positive electrode active material, since a side reaction occurred at a voltage of 4.20 V or more to rapidly degrade battery characteristics, there was a limitation in that operation at a high voltage was not possible. With respect to a secondary battery using a lithium cobalt-based oxide alone as a positive electrode active material, a high-voltage operation was possible, but there was a limitation in that capacity characteristics were poor. In order to address the above limitations, secondary batteries using a mixture of the lithium nickel cobalt manganese-based oxide and the lithium cobalt-based oxide have been proposed, but these conventional secondary batteries are using powder in the form of a secondary particle, in which a plurality of primary particles having a particle diameter of about 0.1 μm to about 1 μm are aggregated, as the lithium nickel cobalt manganese-based oxide. In a case in which the lithium nickel cobalt manganese-based oxide secondary particle formed by the aggregation of the primary particles having a small average particle diameter as described above is used, since a side reaction with an electrolyte solution severely occurs due to a high specific surface area and a crack phenomenon, in which pores between the primary particles are opened in a charge and discharge process, occurs, cycle characteristics are rapidly degraded at high voltage even if the lithium nickel cobalt manganese-based oxide is used with the lithium cobalt-based oxide, and thus, it is difficult to obtain satisfactory performance at high voltage.

Also, in a case in which two types of positive electrode active materials having different components are used, an electrochemical behavior, which is different from that occurs when each of the positive electrode active materials is used alone, occurs. For example, with respect to a secondary battery in which the lithium nickel cobalt manganese-based oxide and the lithium cobalt-based oxide are mixed and used, a phenomenon occurs in which a positive electrode potential is more reduced during charge and discharge than a secondary battery in which each of the positive electrode active materials is used alone, wherein, in a case in which the positive electrode potential is reduced as described above, there is a problem in that a side reaction with an electrolyte solution is intensified under high-temperature and/or high-voltage conditions.

As a result of significant amount of research conducted to solve the above-described problem and develop a lithium secondary battery having excellent characteristics at a high voltage, the present inventors have found that, when a lithium nickel cobalt manganese-based oxide having an average particle diameter of primary particles of 3 μm or more and a lithium cobalt-based oxide are mixed and used as a positive electrode active material and a secondary battery is designed so that a capacity ratio of a negative electrode to a positive electrode satisfies a specific range, cycle characteristics, capacity characteristics, and swelling characteristics, which are significantly better than those of a conventional secondary battery, may be achieved at a high voltage of 4.35 V or more, thereby leading to the completion of the present invention.

Hereinafter, each component of the lithium secondary battery of the present invention will be described in more detail.

Positive Electrode

The positive electrode according to the present invention includes a positive electrode active material layer including a mixed positive electrode material composed of two positive electrode active materials with different compositions. Specifically, the positive electrode active material layer according to the present invention includes a lithium nickel cobalt manganese-based oxide having a particle diameter of primary particles of 3 μm or more and a lithium cobalt-based oxide.

The lithium nickel cobalt manganese-based oxide is a lithium composite transition metal oxide containing nickel, cobalt, and manganese as transition metal elements, wherein the lithium nickel cobalt manganese-based oxide, for example, may be represented by Formula 1 below.

$$\text{Li}_x[\text{Ni}_y\text{Co}_z\text{Mn}_w\text{M}_{v}^{1}]\text{O}_{2-p}\text{A}_p \qquad \text{[Formula 1]}$$

In [Formula 1], $M^1$ is a doping element substituted for transition metal sites and may include at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo).

A is an element substituted for oxygen sites and may include at least one element selected from the group consisting of fluorine (F), chlorine (Cl), bromine (Br), iodine (I), astatine (At), and sulfur (S).

x represents an atomic ratio of lithium to total transition metals in the lithium nickel cobalt manganese-based oxide, wherein x may be in a range of 1 to 1.30, preferably greater than 1 to 1.30 or less, and more preferably 1.005 to 1.30, for example, 1.01 to 1.20. In a case in which the atomic ratio of the lithium satisfies the above range, a lithium nickel cobalt manganese-based oxide, in which crystallinity is high while an average particle diameter of primary particles is 3 μm or more and cation mixing is low, may be obtained.

y represents an atomic ratio of nickel among the transition metals in the lithium nickel cobalt manganese-based oxide, wherein y is in a range of 0.3 or more to less than 1, for example, 0.5 to 0.95. Since higher capacity may be achieved as an amount of the nickel among the transition metals is increased, that the atomic ratio of the nickel is 0.5 or more is more advantageous for achieving high capacity.

z represents an atomic ratio of cobalt among the transition metals in the lithium nickel cobalt manganese-based oxide, wherein z is in a range of greater than 0 to 0.6 or less, for example, 0.01 to 0.4.

w represents an atomic ratio of manganese among the transition metals in the lithium nickel cobalt manganese-based oxide, wherein w is in a range of greater than 0 to 0.6 or less, for example, 0.01 to 0.4.

v represents an atomic ratio of the doping element $M^1$ doped into the transition metal sites in the lithium nickel cobalt manganese-based oxide, wherein v may be in a range of 0 to 0.2, for example, 0 to 0.1. In a case in which the doping element $M^1$ is added, there is an effect of improving structural stability of the lithium nickel cobalt manganese-based oxide, but, since capacity may be reduced when the amount of the doping element is increased, it is desirable that the doping element is included at an atomic ratio of 0.2 or less.

p represents an atomic ratio of the element A substituted for the oxygen sites, wherein p may be in a range of 0 to 0.2, for example, 0 to 0.1.

In Formula 1, y+z+w+v=1.

The lithium nickel cobalt manganese-based oxide used in the present invention has an average particle diameter of the primary particles of 3 μm or more, for example, 3 μm to 10 μm. In a case in which the average particle diameter of the primary particles of the lithium nickel cobalt manganese-based oxide is less than 3 μm, a contact area with an electrolyte solution is increased due to an increase in specific surface area, this causes a limitation in that metal ions are dissolved from the lithium nickel cobalt manganese-based oxide or a side reaction with the electrolyte solution is intensified, and such a phenomenon occurs more significantly when an operating voltage is high. As a result, cycle characteristics are rapidly degraded and swelling occurs under high voltage conditions.

In contrast, if particles, in which an average particle diameter of primary particles is 3 μm or more, are used as the lithium nickel cobalt manganese-based oxide, since the contact area with the electrolyte solution is decreased, the side reaction with the electrolyte solution, which causes swelling and battery performance degradation, may not only be minimized, but compression density may also be improved during the preparation of the positive electrode to achieve high energy density.

The lithium nickel cobalt manganese-based oxide in the form of a single particle or secondary particle may have an average particle diameter $D_{50}$ of 3 μm to 30 μm, preferably 3 μm to 15 μm, and more preferably 3 μm to 10 μm. In a case in which the average particle diameter $D_{50}$ of the lithium nickel cobalt manganese-based oxide satisfies the above range, high compression density may be achieved when the lithium cobalt-based oxide to be described later is mixed, and, as a result, an effect of improving energy density may be obtained.

Also, in the lithium nickel cobalt manganese-based oxide used in the present invention, an amount of $Ni^{2+}$ ions occupying lithium sites may be in a range of 5.0 atm % or less, for example, 0.1 atm % to 4.0 atm %. In a case in which the amount of the $Ni^{2+}$ ions occupying the lithium sites satisfies the above range, better electrochemical performance may be achieved.

In a case in which transition metal cations having a size similar to that of a lithium ion ($Li^+$) are present in a lithium transition metal oxide, a phenomenon occurs in which transition metal is incorporated into a lithium layer, wherein this is referred to as cation mixing phenomenon. With respect to the lithium nickel cobalt manganese-based oxide, since a difference in sizes between $Li^+$ and a $Co^{3+}$, $Mn^{4+}$, or $Ni^{3+}$ ion is large, cation mixing is less likely to occur. However, since a $Ni^{2+}$ ion with an oxidation number of +2 among nickel ions has a size similar to that of the lithium ion, cation mixing is likely to occur. Since a layered crystal structure does not develop properly when the $Ni^{2+}$ ions are mixed in the lithium layer, structural stability of the active material is reduced and movement of the lithium ions is prevented by the $Ni^{2+}$ ions present in the lithium layer, and thus, battery performance is degraded. Therefore, in the present invention, excellent electrochemical performance was allowed to be realized by using the lithium nickel cobalt manganese-based oxide in which the amount of the $Ni^{2+}$ ions occupying the lithium sites was 5.0 atm % or less.

The lithium nickel cobalt manganese-based oxide may have a monolithic structure composed of the primary particles or may be in the form of a secondary particle in which 30 or less, preferably 10 or less, of the primary particles are aggregated. In a case in which the lithium nickel cobalt manganese-based oxide having the monolithic structure or a structure, in which a relatively small number of the primary particles are aggregated as described above, is used, a specific surface area may be decreased to minimize the side reaction with the electrolyte solution, and the compression density may be improved to achieve high energy density.

The lithium nickel cobalt manganese-based oxide of the present invention as described above may be prepared by a method in which a lithium raw material and a transition metal precursor are mixed such that a ratio of the number of lithium atoms to the number of total transition metal atoms is in a range of 1 or more, for example, 1.005 to 1.30, and then heat-treated at a relatively high temperature.

The lithium raw material, for example, may include lithium-containing carbonates (e.g., lithium carbonate, etc.), hydrates (e.g., lithium hydroxide monohydrate ($LiOH \cdot H_2O$), etc.), hydroxides (e.g., lithium hydroxide, etc.), nitrates (e.g., lithium nitrate ($LiNO_3$), etc.), or chlorides (e.g., lithium chloride (LiCl), etc.), but the lithium raw material is not limited thereto.

The transition metal precursor, for example, may include a hydroxide, oxyhydroxide, carbonate, or organic complex of nickel manganese cobalt or may include a hydroxide, oxyhydroxide, carbonate, or organic complex of nickel manganese cobalt containing the doping element $M^1$. For example, the nickel cobalt manganese-based precursor may be [Ni$_y$Co$_z$Mn$_w$](OH)$_2$, [Ni$_y$Co$_z$Mn$_w$Al$_v$](OH)$_2$, [Ni$_y$Co$_z$Mn$_w$]O·OH, or [Ni$_y$Co$_z$Mn$_w$Al$_v$]O·OH (where y, z, w, and v are the same as defined in Formula 1), but the nickel cobalt manganese-based precursor is not limited thereto.

It is desirable that the heat treatment temperature may be a temperature higher than a sintering temperature typically used when a conventional lithium nickel cobalt manganese-based oxide having the same transition metal ratio is prepared, for example, a temperature that is 100° C. or more higher than the sintering temperature typically used. For example, the heat treatment temperature may be in a range of 850° C. to 1,100° C., for example, 950° C. to 1,050° C.

In general, a lithium nickel cobalt manganese-based oxide has an appropriate sintering temperature depending on a composition of transition metals. For example, in a case in which an atomic ratio of nickel:cobalt:manganese is 5:3:2, it is known that the appropriate sintering temperature is in a range of 750° C. to 850° C., and, in a case in which the atomic ratio of nickel:cobalt:manganese is 8:1:1, it is known that the appropriate sintering temperature is in a range of 700° C. to 800° C.

In a case in which sintering is performed at a temperature lower than the appropriate sintering temperature, the electrochemical performance may be degraded due to insufficient crystal growth, and, if the sintering temperature is excessively higher than the appropriate sintering temperature, a cation mixing or oxygen desorption phenomenon may occur to reduce the structural stability.

In a case in which the conventional appropriate sintering temperature is used, the particle diameter of the primary particles of the lithium nickel cobalt manganese-based oxide is formed to be less than 3 μm (typically 0.1 μm to 1 μm level). The particle diameter of the primary particles may be formed to be large when the sintering temperature is increased, but, in a case in which only the sintering temperature is increased without changing other conditions, oxygen desorption occurs, a large amount of relatively more stable Ni$^{2+}$ ions than Ni$^{3+}$ ions is generated to maintain an electrical equilibrium state when the oxygen desorption occurs, and, as a result, the cation mixing phenomenon is intensified and the crystallinity is reduced to significantly degrade the electrochemical performance.

However, in a case in which the sintering is performed at a relatively high temperature after the lithium raw material and the transition metal precursor are mixed such that the ratio of the number of lithium atoms to the number of total transition metal atoms is in a range of 1 or more, for example, 1.005 to 1.30 as in the present invention, a lithium nickel cobalt manganese-based oxide, in which the cation mixing is low while the average particle diameter of the primary particles is 3 μm or more and the crystallinity is excellent, may be obtained. When there are many lithium ions in reactants, a ratio of the lithium ions occupying the lithium sites increases stochastically, and the oxidation number of the transition metal is increased to convert Ni$^{2+}$ ions to Ni$^{3+}$ ions. Also, when the oxidation number of the transition metal element is increased, a binding energy between a transition metal ion and an oxygen ion increases to reduce a transition metal layer spacing, and as a result, an interlayer spacing between the lithium layer and a transition metal layer may be increased to suppress the incorporation of the transition metal into the lithium layer. Thus, a lithium nickel cobalt manganese-based oxide, in which the cation mixing is low while the average particle diameter of the primary particles is large at 3 μm or more and the crystallinity is excellent, may be prepared by the above-described method.

Next, the lithium cobalt-based oxide is a lithium transition metal oxide containing cobalt as a transition metal element, wherein the lithium cobalt-based oxide, for example, may be represented by Formula 2 below.

$$LiCo_{1-a}M^2{}_aO_{2-b}B_b \qquad \text{[Formula 2]}$$

In Formula 2, M$^2$ is a doping element substituted for cobalt sites and may include at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

B is an element substituted for oxygen sites and may include at least one element selected from the group consisting of F, Cl, Br, I, At, and S.

a represents an atomic ratio of the doping element M$^2$ substituted for the cobalt sites, wherein a may be in a range of 0 to 0.2, for example, 0 to 0.1.

b represents an atomic ratio of the element B substituted for the oxygen sites, wherein b may be in a range of 0 to 0.2, for example, 0 to 0.1.

In general, a lithium cobalt-based oxide has better life characteristics and swelling characteristics at high voltage than the lithium nickel cobalt manganese-based oxide. In a case in which the lithium cobalt-based oxide is mixed and used with the lithium nickel cobalt manganese-based oxide, the mixture may be stably operated even at a high voltage similar to the lithium cobalt-based oxide.

Although the lithium cobalt-based oxide used in the present invention is not limited thereto, the lithium cobalt-based oxide may have an average particle diameter D$_{50}$ of 10 μm to 20 μm, for example, 12 μm to 20 μm. In a case in which the average particle diameter D$_{50}$ of the lithium cobalt-based oxide satisfies the above range, the lithium cobalt-based oxide may be mixed with lithium nickel cobalt manganese-based oxide particles having a relatively smaller size to achieve high compression density, and, as a result, an effect of improving the energy density may be obtained.

The lithium nickel cobalt manganese-based oxide and the lithium cobalt-based oxide may be included in a weight ratio of 50:50 to 80:20, for example, 60:40 to 80:20 in the positive electrode active material layer. Since the lithium nickel cobalt manganese-based oxide having relatively better capacity characteristics is included in an amount of 50% or more, high-capacity characteristics may be achieved.

Also, a total weight of the lithium nickel cobalt manganese-based oxide and the lithium cobalt-based oxide may be in a range of 80 wt % to 98 wt %, for example, 85 wt % to 98 wt % based on a total weight of the positive electrode active material layer. When the positive electrode active material is included in an amount within the above range, excellent capacity characteristics may be exhibited.

The positive electrode active material layer may further include a conductive agent and a binder, if necessary.

The conductive agent is used to provide conductivity to the electrode, wherein any conductive agent may be used without particular limitation as long as it has suitable electron conductivity without causing adverse chemical changes in the battery.

Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The conductive agent may be included in an amount of 1.5 wt % or more, preferably 1.5 wt % to 5 wt %, and more preferably 1.5 wt % to 3 wt % based on the total weight of the positive electrode active material layer. If the amount of the conductive agent is less than 1.5 wt % in the positive electrode in which the lithium nickel cobalt manganese-based oxide and the lithium cobalt-based oxide are mixed and used as in the present invention, output may be reduced.

Next, the binder improves the adhesion between the positive electrode active material particles and the adhesion between the positive electrode active material and a current collector.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode of the present invention may be prepared according to a typical method of preparing a positive electrode except that a specific positive electrode active material according to the present invention is used. Specifically, a positive electrode material mixture, which is prepared by dissolving or dispersing the positive electrode active material, the binder, and/or the conductive agent in a solvent, is coated on the positive electrode collector, and the positive electrode may then be prepared by drying and rolling the coated positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of the positive electrode material mixture, manufacturing yield, and workability, and is not particularly limited.

Also, as another method, the positive electrode may be prepared by casting the positive electrode material mixture on a separate support and then laminating a film separated from the support on the positive electrode collector.

Negative Electrode

Next, a negative electrode will be described.

The negative electrode according to the present invention includes a negative electrode active material layer including a negative electrode active material.

The negative electrode active material may include at least one of a carbon-based negative electrode active material or a silicon-based negative electrode active material.

As the carbon-based negative electrode active material, various carbon-based negative electrode active materials used in the art, for example, irregular, planar, flaky, spherical, or fibrous natural graphite or artificial graphite, Kish graphite, pyrolytic carbon, mesophase pitch based carbon fiber, meso-carbon microbeads, mesophase pitches, high-temperature sintered carbon such as petroleum or coal tar pitch derived cokes, soft carbon, and hard carbon may be used.

Preferably, the carbon-based negative electrode active material may include at least one of natural graphite or artificial graphite. More preferably, the carbon-based negative electrode active material may include natural graphite and artificial graphite. In a case in which the natural graphite and the artificial graphite are used together, adhesion with a current collector may be increased to suppress exfoliation of the active material.

The silicon-based negative electrode active material may include at least one selected from the group consisting of metallic silicon (Si), silicon oxide ($SiO_x$, where $0<x<2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, barium (Ba), radium (Ra), Sc, Y, Ti, Zr, hafnium (Hf), rutherfordium (Rf), V, Nb, Ta, dubnium (Db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, tin (Sn), In, germanium (Ge), phosphorus (P), arsenic (As), antimony (Sb), bismuth (Bi), S, selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is included.

According to an embodiment, the negative electrode active material may be a mixture of the silicon-based negative electrode active material and the carbon-based negative electrode active material, and, in this case, a mixing ratio of the silicon-based negative electrode active material: the carbon-based negative electrode active material may be in a range of 1:99 to 50:50, for example, 5:95 to 30:70, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

The negative electrode active material layer may further include a binder and a conductive agent in addition to the negative electrode active material.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber, a nitrile-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The negative electrode active material layer may be prepared by coating the negative electrode collector with a negative electrode material mixture, which is prepared by dissolving or dispersing the negative electrode active material as well as selectively the binder and the conductive agent in a solvent, and drying the coated negative electrode collector, or may be prepared by casting the negative electrode material mixture on a separate support and then laminating a film separated from the support on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 µm to 500 µm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode material mixture may be adjusted to have an appropriate viscosity in consideration of a coating thickness of the negative electrode material mixture, manufacturing yield, and workability, and is not particularly limited.

The lithium secondary battery of the present invention has a ratio of negative electrode capacity to positive electrode capacity of 1.06 to 1.15, for example, 1.06 to 1.12.

According to studies by the present inventors, with respect to a lithium secondary battery using a mixed positive electrode material of lithium nickel cobalt manganese-based oxide and lithium cobalt-based oxide, it has been found that significantly better cycle characteristics and swelling characteristics may be obtained at high voltage when the ratio of the negative electrode capacity to the positive electrode capacity satisfies a specific range, that is, 1.06 to 1.15. Specifically, it has been found that, if the ratio of the negative electrode capacity to the positive electrode capacity is less than 1.06 or greater than 1.15, capacity characteristics and swelling characteristics are rapidly degraded in a long-term cycle and swelling is rapidly increased during high-temperature storage.

Such characteristics are completely different from characteristics that are observed in a lithium secondary battery using the lithium nickel cobalt manganese-based oxide or the lithium cobalt-based oxide alone. This may be confirmed through FIGS. 4 and 5 of the present invention.

Figure 5:
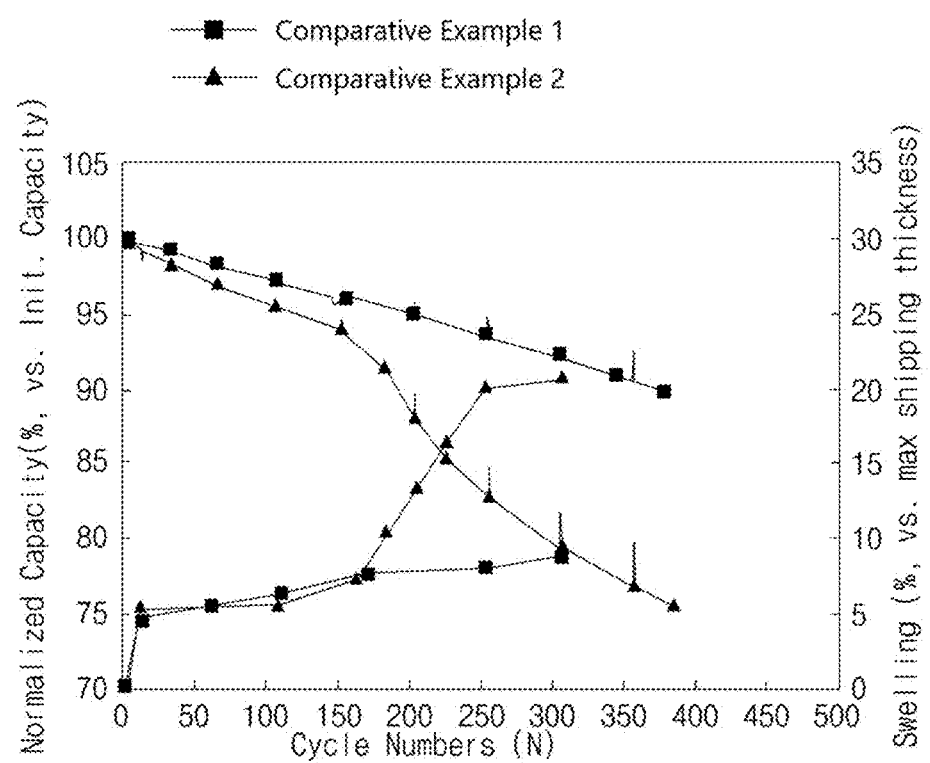
FIG. 5 is a graph showing high-voltage life characteristics and swelling characteristics of lithium secondary batteries of Comparative Example 1 and Comparative Example 2.

A graph comparing cycle characteristics and swelling characteristics of a lithium secondary battery (Comparative Example 1), in which the lithium cobalt-based oxide is used alone and the ratio of the negative electrode capacity to the positive electrode capacity is 1.01, and a lithium secondary battery (Comparative Example 2), in which the lithium cobalt-based oxide is used alone and the ratio of the negative electrode capacity to the positive electrode capacity is 1.07, is illustrated in FIG. 5. As illustrated in FIG. 5, with respect to the lithium secondary batteries in which the lithium cobalt-based oxide is used alone, it may be confirmed that the cycle characteristics and swelling characteristics of Comparative Example 2, in which the capacity ratio of the negative electrode to the positive electrode is 1.07, were significantly degraded in comparison to those of Comparative Example 1 in which the capacity ratio of the negative electrode to the positive electrode is 1.01. That is, with respect to the lithium secondary batteries in which the lithium cobalt-based oxide is used alone, the cycle characteristics and swelling characteristics are better when the ratio of the negative electrode capacity to the positive electrode capacity is less than 1.06.

Figure 4:
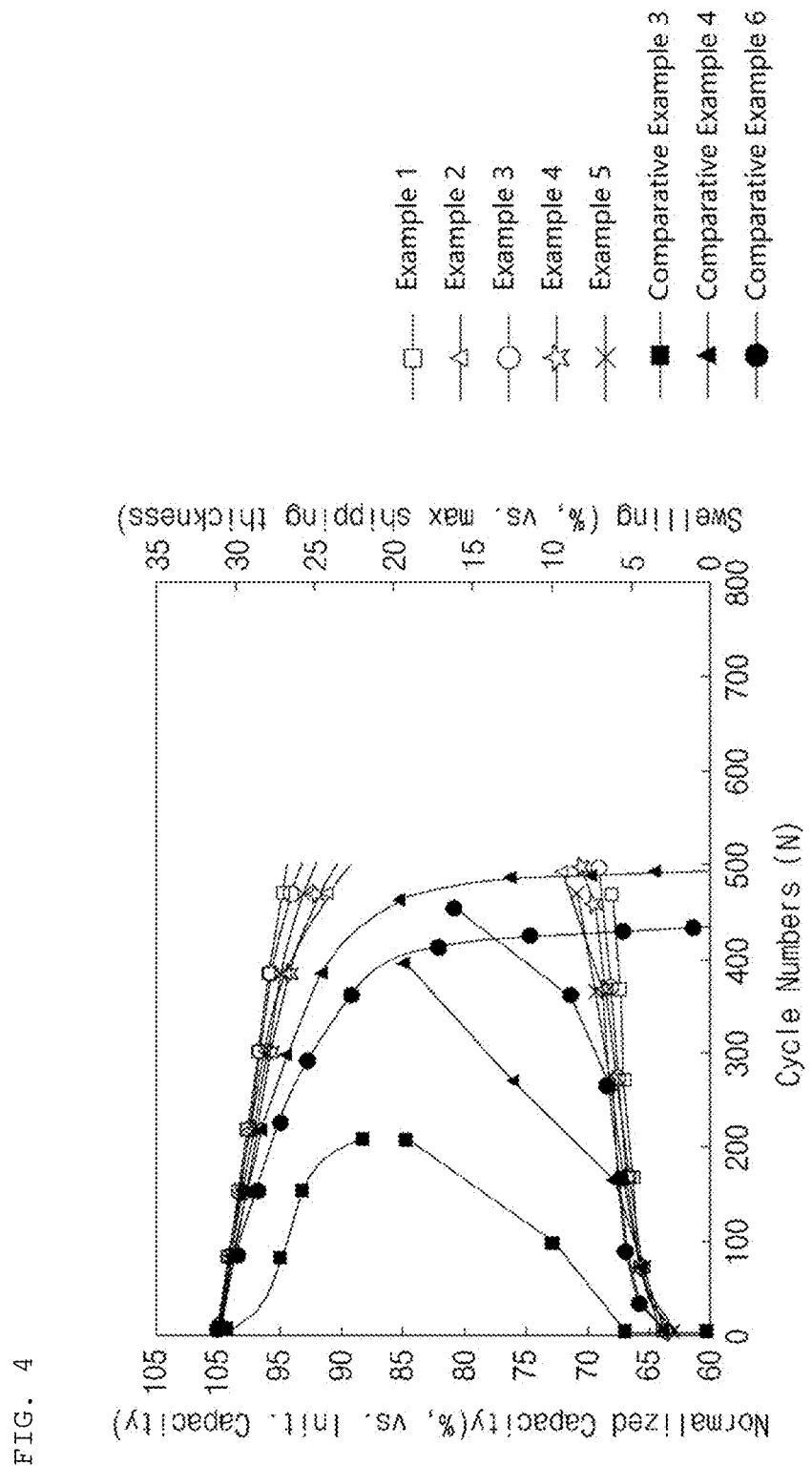
FIG. 4 is a graph showing high-voltage life characteristics and swelling characteristics of lithium secondary batteries of Examples 1 to 5 and Comparative Examples 3, 4, and 6.

In contrast, with respect to the lithium secondary battery using the mixed positive electrode material as in the present invention, different from the lithium secondary battery in which the lithium cobalt-based oxide is used, the cycle characteristics and swelling characteristics are better when the ratio of the negative electrode capacity to the positive electrode capacity is 1.06 or more. A graph comparing cycle characteristics and swelling characteristics of a lithium secondary battery (Example 1), in which the mixed positive electrode material of the lithium nickel cobalt manganese-based oxide and the lithium cobalt-based oxide is used and the ratio of the negative electrode capacity to the positive electrode capacity is 1.07, and a lithium secondary battery (Comparative Example 3), in which the same mixed positive electrode material is used but the ratio of the negative electrode capacity to the positive electrode capacity is 1.04, is illustrated in FIG. 4. Referring to FIG. 4, in the lithium secondary batteries using the mixed positive electrode material as in the present invention, it may be confirmed that the cycle characteristics and swelling characteristics are better when the ratio of the negative electrode capacity to the positive electrode capacity is 1.06 or more.

Electrolyte

Next, an electrolyte will be described.

As the electrolyte used in the present invention, an organic liquid electrolyte, an inorganic liquid electrolyte, a solid polymer electrolyte, a gel-type polymer electrolyte, a solid inorganic electrolyte, or a molten-type inorganic electrolyte, which may be used in the lithium secondary battery, may be used, but the electrolyte is not particularly limited.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as Ra-CN (where Ra is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent.

Among these solvents, the carbonate-based solvent is preferable, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) is more preferable.

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The lithium salt may be appropriately changed in a normally usable range, but may specifically be included in a concentration of 0.8 M to 3 M, for example, 0.1 M to 2.5 M in the electrolyte solution.

In order to improve lifetime characteristics of the battery, suppress the reduction in battery capacity, and improve discharge capacity of the battery, various additives may be included in the electrolyte in addition to the above components. The additive, for example, may include a haloalkylene carbonate-based compound such as difluoroethylene carbonate; pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and these additives may be used alone or in a mixture thereof. In this case, the additive may be included in an amount of 0.1 wt % to 5 wt % based on a total weight of the electrolyte.

Separator

The lithium secondary battery according to the present invention may include a separator, if necessary.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Since the lithium secondary battery according to the present invention as described above has excellent stability and electrochemical performance even at a high voltage, an operating voltage may be 4.35 V or more, and, in a case in which the lithium secondary battery is operated at such high voltage, excellent high-capacity characteristics may be achieved in comparison to a conventional lithium secondary battery.

The lithium secondary battery according to the present invention as described above may be suitably used in portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Preparation Example 1

Lithium raw material LiOH and nickel cobalt manganese precursor $Ni_{0.5}Co_{0.3}Mn_{0.2}(OH)_2$ were mixed such that an atomic ratio of Li:transition metal was 1.05:1.00, and then heat-treated at 1,000° C. for 10 hours to prepare $Li[Ni_{0.5}Co_{0.3}Mn_{0.2}]O_2$ powder having an average particle diameter $D_{50}$ of primary particles of 5 μm.

FIG. 1 illustrates a scanning electron microscope (SEM) image of the $Li[Ni_{0.5}Co_{0.3}Mn_{0.2}]O_2$ powder prepared as described above. As illustrated in FIG. 1, it was shown that single particles in the form of primary particles and secondary particles, in which the number of the primary particles aggregated was 10 or less, were mixed in the $Li[Ni_{0.5}Co_{0.3}Mn_{0.2}]O_2$ powder, and an average particle diameter $D_{50}$ of the $Li[Ni_{0.5}Co_{0.3}Mn_{0.2}]O_2$ powder was 7 μm.

Preparation Example 2

$Li[Ni_{0.5}Co_{0.3}Mn_{0.2}]O_2$ powder having an average particle diameter $D_{50}$ of primary particles of about 3.5 μm was prepared in the same manner as in Preparation Example 1 except that a heat treatment was performed at 950° C.

Figure 2:
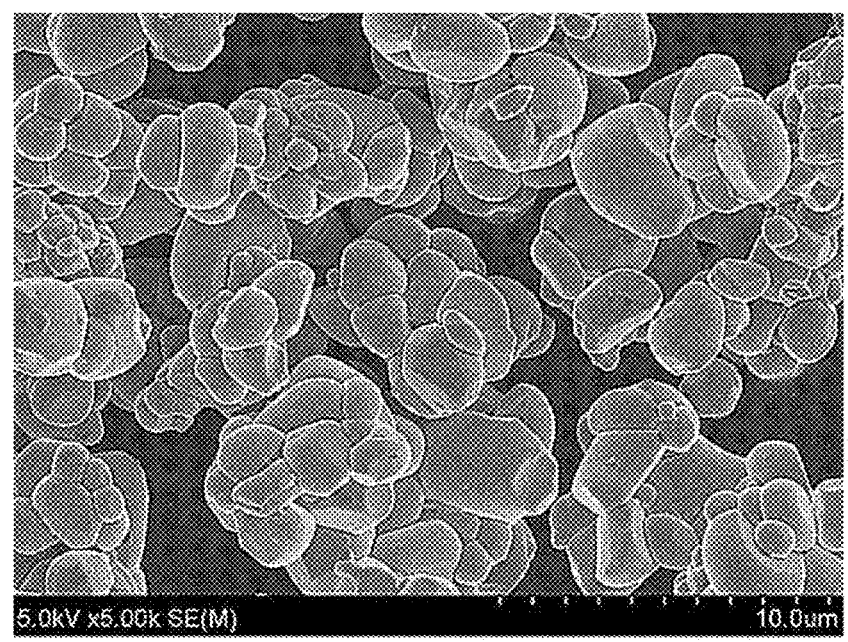
FIG. 2 is an SEM image of lithium nickel cobalt manganese-based oxide powder prepared by Preparation Example 2.

FIG. 2 illustrates an SEM image of the $Li[Ni_{0.5}Co_{0.3}Mn_{0.2}]O_2$ powder prepared as described above. As illustrated in FIG. 2, the prepared $Li[Ni_{0.5}Co_{0.3}Mn_{0.2}]O_2$ powder was in the form of a secondary particle in which the number of the primary particles aggregated was 30 or less, and an average particle diameter $D_{50}$ of the $Li[Ni_{0.5}Co_{0.3}Mn_{0.2}]O_2$ powder was 8 μm.

Preparation Example 3

$Li[Ni_{0.5}Co_{0.3}Mn_{0.2}]O_2$ powder was prepared in the same manner as in Preparation Example 1 except that a heat treatment was performed at 800° C.

Figure 3:
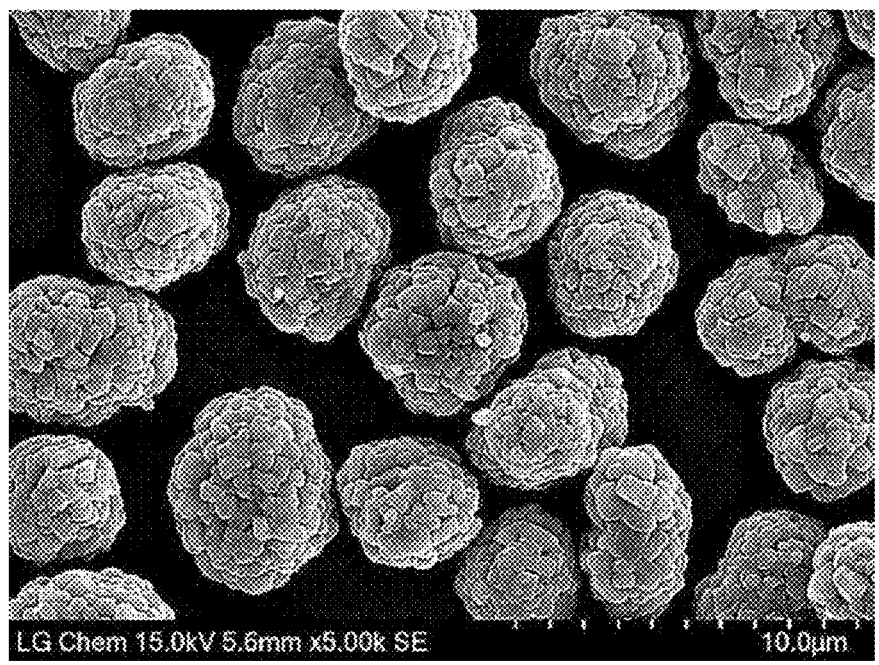
FIG. 3 is an SEM image of lithium nickel cobalt manganese-based oxide powder prepared by Preparation Example 3.

FIG. 3 illustrates an SEM image of the $Li[Ni_{0.5}Co_{0.3}Mn_{0.2}]O_2$ powder prepared as described above. As illustrated in FIG. 3, the prepared $Li[Ni_{0.5}Co_{0.3}Mn_{0.2}]O_2$ powder was in the form of a secondary particle in which a few tens of primary particles having a particle diameter of 1 μm or less were aggregated, and an average particle diameter $D_{50}$ of the secondary particle was 6 μm.

Example 1

A positive electrode active material, a conductive agent, and a binder were mixed in an N-methylpyrrolidone solvent at a weight ratio of 96.9:1.7:1.4 to prepare a positive electrode material mixture.

In this case, the lithium nickel cobalt manganese-based oxide prepared by Preparation Example 1 and $LiCoO_2$ having an average particle diameter $D_{50}$ of 16 μm were mixed in a weight ratio of 70:30 and used as the positive electrode active material.

Li435 by Denka Company Limited was used as the conductive agent, and KF9700 by Zeon Corporation was used as the binder.

A 10 μm thick aluminum current collector (Sam-A Aluminum) was coated with the positive electrode material mixture prepared, dried at 100° C., and then rolled to prepare a positive electrode.

Next, a negative electrode active material, a binder/thickener, and a conductive agent were mixed in an N-methylpyrrolidone solvent at a weight ratio of 95.8:3.7:0.5 to prepare a negative electrode material mixture. In this case, artificial graphite (Shanshan Technology, QCGX) was used as the negative electrode active material, Li435 by Denka Company Limited was used as the conductive agent, and BML302 by Zeon Corporation was used as the binder.

An 8 μm thick copper current collector (LS Mtron Ltd.) was coated with the negative electrode material mixture prepared, dried at 130° C., and then rolled to prepare a negative electrode.

A loading amount of the positive electrode and a loading amount of the negative electrode were adjusted such that a ratio of negative electrode capacity to positive electrode capacity was 1.07 during the preparation of the negative electrode and the positive electrode.

A separator was disposed between the positive electrode and negative electrode prepared as described above and an electrolyte solution was injected to prepare a lithium secondary battery.

Example 2

A lithium secondary battery was prepared in the same manner as in Example 1 except that the lithium nickel cobalt manganese-based oxide prepared by Preparation Example 2 and $LiCoO_2$ having an average particle diameter $D_{50}$ of 16 μm were mixed in a weight ratio of 70:30 and used as a positive electrode active material.

Example 3

A lithium secondary battery was prepared in the same manner as in Example 1 except that the loading amount of the positive electrode and the loading amount of the negative electrode were adjusted such that the ratio of the negative electrode capacity to the positive electrode capacity was 1.09.

Example 4

A lithium secondary battery was prepared in the same manner as in Example 1 except that the loading amount of the positive electrode and the loading amount of the negative electrode were adjusted such that the ratio of the negative electrode capacity to the positive electrode capacity was 1.10.

Example 5

A lithium secondary battery was prepared in the same manner as in Example 1 except that the loading amount of the positive electrode and the loading amount of the negative electrode were adjusted such that the ratio of the negative electrode capacity to the positive electrode capacity was 1.12.

Comparative Example 1

A lithium secondary battery was prepared in the same manner as in Example 1 except that $LiCoO_2$ having an average particle diameter $D_{50}$ of 16 μm was used alone as a positive electrode active material, and the loading amount of the positive electrode and the loading amount of the negative electrode were adjusted such that the ratio of the negative electrode capacity to the positive electrode capacity was 1.01.

Comparative Example 2

A lithium secondary battery was prepared in the same manner as in Example 1 except that $LiCoO_2$ having an average particle diameter $D_{50}$ of 16 μm was used alone as a positive electrode active material, and the loading amount of the positive electrode and the loading amount of the negative electrode were adjusted such that the ratio of the negative electrode capacity to the positive electrode capacity was 1.07.

Comparative Example 3

A lithium secondary battery was prepared in the same manner as in Example 1 except that the loading amount of the positive electrode and the loading amount of the negative electrode were adjusted such that the ratio of the negative electrode capacity to the positive electrode capacity was 1.04.

Comparative Example 4

A lithium secondary battery was prepared in the same manner as in Example 1 except that the loading amount of the positive electrode and the loading amount of the negative electrode were adjusted such that the ratio of the negative electrode capacity to the positive electrode capacity was 1.17.

Comparative Example 5

A lithium secondary battery was prepared in the same manner as in Example 1 except that the lithium nickel cobalt manganese-based oxide prepared by Preparation Example 3 and $LiCoO_2$ having an average particle diameter $D_{50}$ of 16 μm were mixed in a weight ratio of 70:30 and used as a positive electrode active material.

Comparative Example 6

A lithium secondary battery was prepared in the same manner as in Example 1 except that the loading amount of the positive electrode and the loading amount of the negative electrode were adjusted such that the ratio of the negative electrode capacity to the positive electrode capacity was 1.05.

Experimental Example 1

High-voltage life characteristics and swelling characteristics of the lithium secondary batteries prepared by Examples 1 to 5 and Comparative Examples 1 to 6 were evaluated.

Specifically, each of the lithium secondary batteries prepared in Examples 1 to 5 and Comparative Examples 1 to 6 was charged at 1.0 C to 4.35 V (0.05 C cut off) under a constant current/constant voltage (CC/CV) condition at 23° C. Subsequently, each lithium secondary battery was discharged at a constant current (CC) of 0.5 C to 3.0 V.

The above charge and discharge behavior was set as one cycle, and, after this cycle was repeated 300 times, discharge capacity after 300 cycles and initial discharge capacity (discharge capacity after one cycle) were compared to measure a capacity retention defined by the following Equation (1).

Capacity retention (%)=[(discharge capacity after 300 cycles−initial discharge capacity)/initial discharge capacity]×100   Equation (1)

Also, a battery thickness after 300 cycles and an initial battery thickness (battery thickness after one cycle) were measured to measure swelling characteristics defined by the following Equation (2).

Swelling (%)=[(battery thickness after 300 cycles−initial battery thickness)/initial battery thickness]×100   Equation (2)

Measurement results are listed in Table 1 below.

TABLE 1

|  | Capacity retention (%) | Swelling characteristics (%) |
| --- | --- | --- |
| Example 1 | 97 | 5 |
| Example 2 | 96 | 6 |
| Example 3 | 96 | 6 |
| Example 4 | 96 | 5 |
| Example 5 | 96 | 6 |
| Comparative Example 1 | 92 | 8 |
| Comparative Example 2 | 78 | 21 |
| Comparative Example 3 | 0 | 30 |
| Comparative Example 4 | 93 | 12.5 |
| Comparative Example 5 | 80 | 12 |
| Comparative Example 6 | 92.5 | 7.5 |

Referring to Table 1, it may be understood that the lithium secondary batteries of Examples 1 to 5 satisfying the condition of the present invention had better cycle characteristics and swelling characteristics during a high-voltage operation than the lithium secondary batteries of Comparative Examples 1 to 6. Particularly, with respect to the lithium secondary battery of Comparative Example 3, in which the ratio of the negative electrode capacity to the positive electrode capacity was 1.04, and the lithium secondary battery of Comparative Example 5 in which the particle diameter of the primary particles of the lithium nickel cobalt manganese-based oxide was outside the range of the present invention, it may be confirmed that cycle characteristics and swelling characteristics during a high-voltage operation were significantly degraded in comparison to those of the present invention. These results indicate that, in order for the lithium secondary battery using the mixed positive electrode material of the lithium nickel cobalt manganese-based oxide and the lithium cobalt-based oxide to achieve stable battery performance at high voltage, the particle diameter of the primary particles of the lithium nickel cobalt manganese-based oxide and the ratio of the negative electrode capacity to the positive electrode capacity must satisfy the ranges of the present invention.

Experimental Example 2

In order to evaluate battery characteristics according to the ratio of the negative electrode capacity to the positive electrode capacity in the lithium secondary batteries using the mixed positive electrode material of the lithium nickel cobalt manganese-based oxide and the lithium cobalt-based oxide as a positive electrode active material, capacity retentions and swelling characteristics were measured while the lithium secondary batteries prepared by Examples 1 to 5 and Comparative Examples 3, 4, and 6 were charged and discharged under the same conditions as in Experimental Example 1. Measurement results are illustrated in FIG. 4.

Referring to FIG. 4, with respect to the lithium secondary batteries of Comparative Examples 3, 4, and 6 in which the mixed positive electrode material was used and the ratio of the negative electrode capacity to the positive electrode capacity was outside the range of the present invention, it may be confirmed that capacity characteristics and swelling characteristics were rapidly degraded in comparison to those of the lithium secondary batteries of the examples. Specifically, with respect to the lithium secondary battery of Comparative Example 3, the capacity characteristics began to degrade rapidly after 50 cycles, and swelling was significantly increased after 100 cycles, and, with respect to the lithium secondary battery of Comparative Example 6, the capacity characteristics also began to degrade after 50 cycles, capacity was rapidly reduced after 150 cycles, and swelling was significantly increased after 250 cycles. Also, with respect to the lithium secondary battery of Comparative Example 4 in which the ratio of the negative electrode capacity to the positive electrode capacity was 1.17, it may be confirmed that capacity was rapidly reduced and swelling was significantly increased after 200 cycles.

In contrast, with respect to the lithium secondary batteries of Examples 1 to 5 in which the mixed positive electrode material was used and the ratio of the negative electrode capacity to the positive electrode capacity was in a range of 1.06 to 1.12, since the capacity retentions and swelling characteristics were maintained well up to 500 cycles, it may be understood that life characteristics were significantly better than those of Comparative Examples 3, 4, and 6.

Experimental Example 3

In order to evaluate battery characteristics according to the ratio of the negative electrode capacity to the positive electrode capacity in the lithium secondary batteries using only the lithium cobalt-based oxide as a positive electrode active material, capacity retentions and swelling characteristics were measured while the lithium secondary batteries prepared by Comparative Examples 1 and 2 were charged and discharged under the same conditions as in Experimental Example 1. Measurement results are illustrated in FIG. 5.

Referring to FIG. 5, with respect to the lithium secondary batteries using only the lithium cobalt-based oxide, it was found that Comparative Example 1, in which the ratio of the negative electrode capacity to the positive electrode capacity was 1.01, had better cycle characteristics and swelling characteristics than Comparative Example 2 in which the ratio of the negative electrode capacity to the positive electrode capacity was 1.07, and this shows an opposite tendency from that shown in FIG. 4.

Also, with respect to the lithium secondary battery of Comparative Example 1, capacity retention was reduced to about 90% in a 400th cycle and swelling characteristics were about 8% in a 300th cycle, and, with respect to the lithium secondary battery of Comparative Example 2, it was found that capacity retention and swelling characteristics were significantly degraded after 150 cycles.

The invention claimed is:
1. A lithium secondary battery comprising:
a positive electrode which includes a positive electrode active material layer including a lithium nickel cobalt manganese-based oxide and a lithium cobalt-based oxide;
a negative electrode which includes a negative electrode active material layer including a negative electrode active material; and
an electrolyte,
wherein an average particle diameter of primary particles of the lithium nickel cobalt manganese-based oxide is 3 μm or more,
a ratio of negative electrode capacity to positive electrode capacity is in a range of 1.06 to 1.15, and
wherein the positive electrode active material layer comprises the lithium nickel cobalt manganese-based oxide and the lithium cobalt-based oxide in a weight ratio of 50:50 to 80:20.

2. The lithium secondary battery of claim 1, wherein the lithium nickel cobalt manganese-based oxide is represented by [Formula 1]:

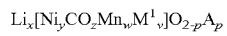  [Formula 1]

wherein, in [Formula 1],
$M^1$ comprises at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
A comprises at least one element selected from the group consisting of F, Cl, Br, I, At, and S, and
$1.0 \le x \le 1.30$, $0.3 \le y < 1$, $0 < z \le 0.6$, $0 < w \le 0.6$, $0 \le v \le 0.2$, and $0 \le p \le 0.2$.

3. The lithium secondary battery of claim 2, wherein an amount of $Ni^{2+}$ ions occupying lithium sites in the lithium nickel cobalt manganese-based oxide is 5.0 atm % or less.

4. The lithium secondary battery of claim 1, wherein the lithium nickel cobalt manganese-based oxide has a monolithic structure composed of the primary particles or is in a form of a secondary particle which is formed by aggregation of 30 or less of the primary particles.

5. The lithium secondary battery of claim 1, wherein the lithium cobalt-based oxide is represented by [Formula 2]:

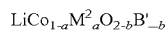  [Formula 2]

wherein, in Formula 2,
$M^2$ comprises at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
B_' comprises at least one element selected from the group consisting of F, Cl, Br, I, At, and S, and
$0 \le a \le 0.2$ and $0 \le b \le 0.1$.

6. The lithium secondary battery of claim 1, wherein the lithium cobalt-based oxide has an average particle diameter $D_{50}$ of 10 μm to 20 μm.

7. The lithium secondary battery of claim 1, wherein the positive electrode active material layer further comprises a conductive agent and a binder.

8. The lithium secondary battery of claim 7, wherein the conductive agent is included in an amount of 1.5 wt % or more based on a total weight of the positive electrode active material layer.

9. The lithium secondary battery of claim 1, wherein the negative electrode active material comprises at least one of a carbon-based negative electrode active material or a silicon-based negative electrode active material.

10. The lithium secondary battery of claim 9, wherein the carbon-based negative electrode active material comprises natural graphite and artificial graphite.

11. The lithium secondary battery of claim 1, wherein the ratio of the negative electrode capacity to the positive electrode capacity is in a range of 1.06 to 1.12.

12. The lithium secondary battery of claim 1, wherein an operating voltage of the lithium secondary battery is 4.35 V or more.

* * * * *